United States Patent [19]

Nakamura

[11] Patent Number: 5,004,908
[45] Date of Patent: Apr. 2, 1991

[54] REFLECTION TYPE PHOTOELECTRIC SWITCH FOR DETECTING THE PRESENCE OF AN OBJECT

[75] Inventor: Arata Nakamura, Kyoto, Japan

[73] Assignee: Omron Tateisi Electronics Co., Kyoto, Japan

[21] Appl. No.: 138,052

[22] Filed: Dec. 28, 1987

[30] Foreign Application Priority Data

Dec. 26, 1986 [JP] Japan ................................. 61-312456

[51] Int. Cl.⁵ ............................................. G01V 9/04
[52] U.S. Cl. .................................. 250/221; 250/226; 340/556
[58] Field of Search ..................... 250/221, 222.1, 226; 340/555, 556, 557

[56] References Cited

U.S. PATENT DOCUMENTS

| 3,944,818 | 3/1976 | Bechtel | 250/221 |
| 4,405,858 | 9/1983 | Spratte | 250/221 |
| 4,433,328 | 2/1984 | Saphis et al. | 340/555 |
| 4,506,153 | 3/1985 | Ohno | 250/226 |
| 4,564,085 | 1/1986 | Melocik et al. | 250/222.1 |
| 4,658,147 | 4/1987 | Eldering | 250/221 |
| 4,752,768 | 6/1988 | Steers et al. | 250/221 |
| 4,760,381 | 7/1988 | Haag | 340/556 |

FOREIGN PATENT DOCUMENTS 105528 10/1983 European Pat. Off. .
2442457 11/1978 France .

Primary Examiner—David C. Nelms
Attorney, Agent, or Firm—Fish & Richardson

[57] ABSTRACT

A reflection type photoelectric switch including a light emitting member for emitting a substantially single light beam having first and second different wavelengths, a reflector for reflecting the emitted light beam at different reflection rates with respect to the first and second and wavelengths, a light receiving member for sensing rays at the first and second wavelengths, and means for analyzing outputs generated from the light receiving member receiving the reflected light beam at the first and second wavelengths to generate an output representing the existence of an object to be detected by the photoelectric switch.

12 Claims, 7 Drawing Sheets

REFLECTION TYPE PHOTOELECTRIC SWITCH FOR DETECTING THE PRESENCE OF AN OBJECT

BACKGROUND OF THE INVENTION

1. Field of the Invention

This invention relates to a reflection type photoelectric switch including a light projecting member for projecting a light beam to a retroreflector and a light receiving member for receiving a reflected light beam from the reflector to produce a light path, whereby an object is detected when it blocks the light path, and move particularly to an improved photoelectric switch which can precisely detect even the object having a mirror surface.

2. Description of the Prior Art

A reflection type photoelectric switch housing light projecting and receiving members is well known in which the light projecting member projects a light beam to a retroreflector and the receiving member receives a reflected light beam from the reflector whereby a detection signal is obtained when the projected light beam is blocked by an object to be detected. Such a conventional photoelectric switch, however, has a disadvantage that an object having a metallic or mirror surface cannot be detected thereby because the light beam projected from the projecting member is reflected on the mirror surface to be received by the receiving member.

In order to overcome such a disadvantage, there has been proposed heretofore a photoelectric switch in which a pair of light projecting members respectively project different wavelength lights to a retroreflector and only one of the projected lights is reflected by the reflector so that the discrimination of the reflector and an object to be detected by the switch is performed by the comparison between the levels of the respective reflected lights. This conventional switch needs two pairs of projecting and receiving members, so that the number of optical components is unnecessary increased. Moreover, the respective optical axes of the respective projecting members are slightly shifted, so that a detection signal is erroneously produced when only one of the pair of optical axes is blocked by the object.

SUMMARY OF THE INVENTION

It is, therefore, a primary object of this invention to provide a reflection type photoelectric switch which can precisely detect the object having a mirror surface by utilizing a relatively simple optical system.

It is a further object of this invention to provide a reflection type photoelectric switch employing a pair of projecting and receiving members to provide a single optical axis utilizing different waveform lights.

In accordance with this invention, there is provided a reflection type photoelectric switch including a light emitting member for emitting rays having first and second different wavelengths, a reflector for reflecting the emitted rays at different reflection rates with respect to the first and second wavelengths, a light receiving member for sensing rays at the first and second wavelengths, and member for analyzing outputs generated from the light receiving member at the first and second wavelengths to generate an output representing the existence of an object to be detected by the photoelectric switch.

According to this switch, one projecting member projects two lights respectively having first and second different wavelengths towards the retroreflector on a single optical axis. The reflector is designed to reflect only one of the two different wavelength lights while the light receiving element housed within the switch is so designed to sense the reflected lights at both wavelengths, so that the object passing the light path between the photoelectric switch and the retroreflector is by the comparison between the levels of the respective reflected lights. Neither lights at the respective wavelengths are received by the receiving member when an object having no mirror surface blocks the light path, while both lights at the two wavelengths are received by the receiving member when an object having a mirror surface blocks the light path to reflect the lights at the wavelengths toward the receiving element, whereby the object with and without a mirror surface is precisely detected by the comparison of the levels of the reflected lights.

These and other objects and advantages of this invention will become apparent from the following detailed description in connection with the accompanying drawings in which:

DETAILED DESCRIPTION OF THE INVENTION

Figure 1:
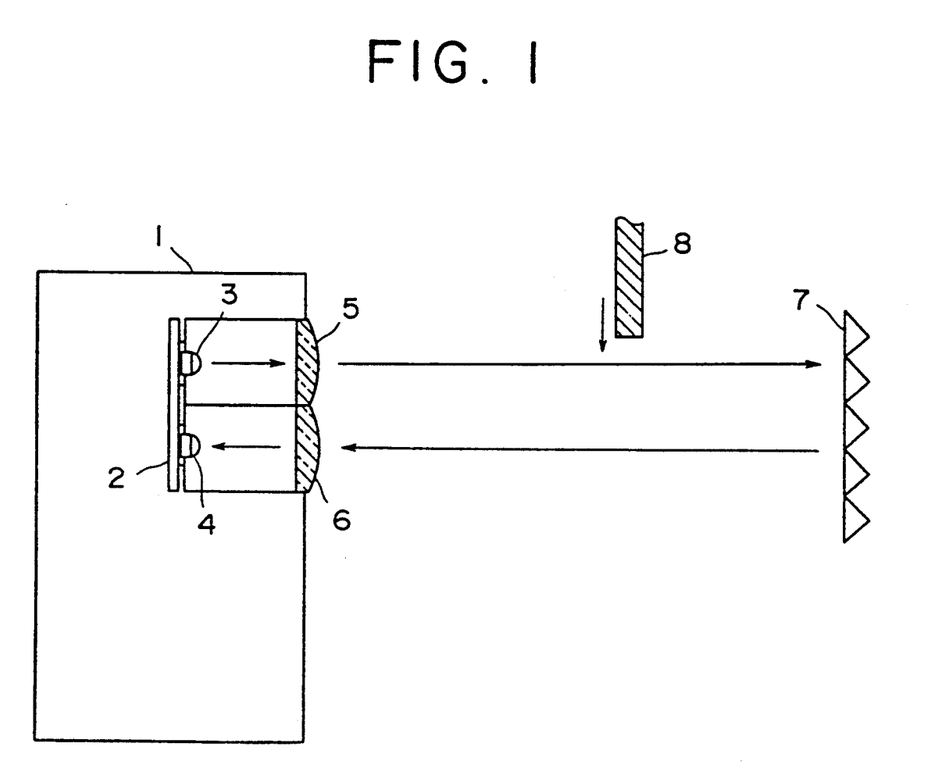
FIG. 1 is a schematic view illustrating an optical construction of a reflection type photoelectric switch of a first embodiment according to this invention.
Figure 2A:
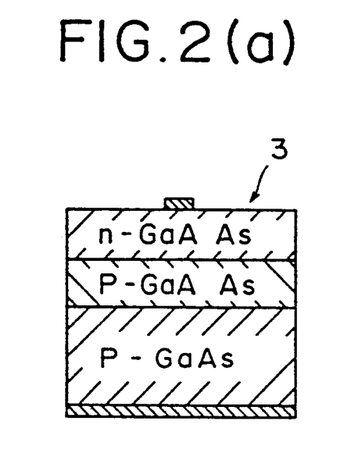
FIG. 2(a) is a sectional side view of a light emitting diode of a multicolor luminous type employed as a light projecting element.
Figure 2B:
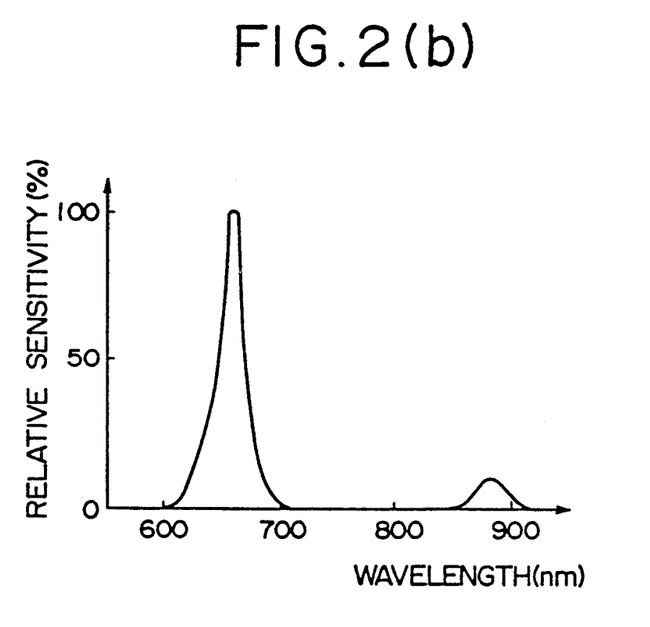
FIG. 2(b) is a graph illustrating a luminous characteristic of the light emitting diode.

Referring to FIG. 1, there is shown a construction of an optical system employing a reflection type photoelectric switch in accordance with a first embodiment of this invention. The switch includes a housing 1, a printed circuit board 2 carrying a light emitting element 3 such as a light emitting diode and a light receiving element 4 such as a photodiode which are mounted on the board 2. The light emitting element 3 may employ a single light emitting diode having a Ga Al As hetero conjunction shown in FIG. 2(a) and a spectrum characteristic wherein different wavelength lights are emitted as shown in FIG. 2(b). If desired, a pair of light emitting diodes respectively emitting different wavelength rays closely mounted on a single base may be employed instead of the single chip of FIG. 2(a) so as to project a substantially single light beam through a single lens. Exemplarily, the light emitting diode may be the diode which simultaneously emits a strong red radiation at 660 nm and a weak infrared radiation at 880 nm as a substantially single light beam. A pair of converging lenses 5 and 6 are respectively disposed corresponding to the light emitting and receiving elements 3 and 4. The converging lens 5 guides the radiation emitted from the emitting element 3 to a retroreflector 7 positioned apart from the main body of the photoelectric switch by a predetermined interval. The reflector 7 is designed to absorb only one of the radiations, e.g. red light, and reflect only another radiation, e.g. infrared, or vice versa.

Figure 3:
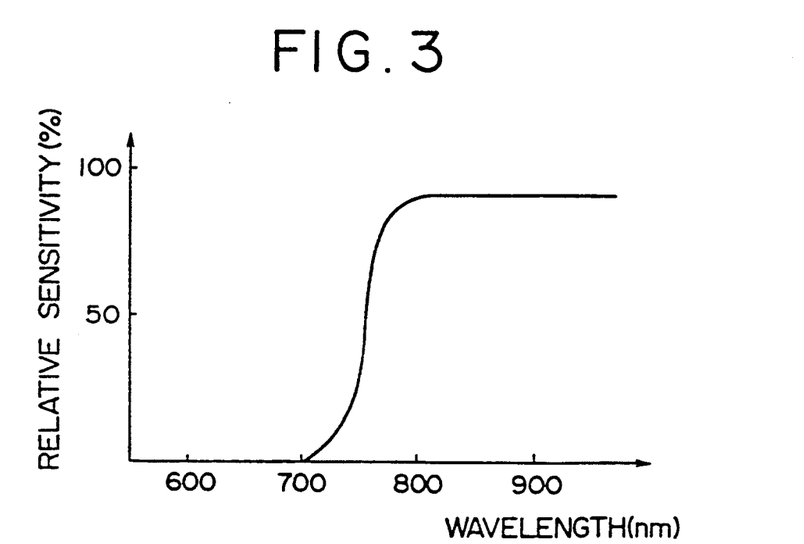
FIG. 3 is a graph illustrating a wavelength response of a retroreflector.

The reflector 7 in this embodiment employs a single mold consisting of combination of corner cubes made of acrylic resins mixed with dyes which absorbs red light and passes infrared rays, and is designated to have spectrum characteristics wherein red rays at 700 nm are reflected at a substantially zero rate but infrared rays at wavelengths longer than 800 nm are reflected at 90% or higher rate as shown in FIG. 3.

Figure 4A:
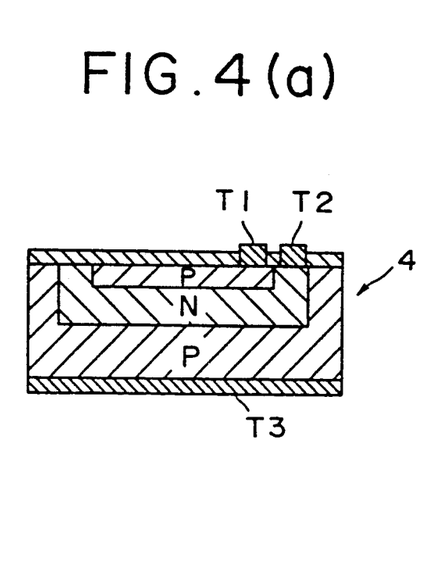
FIG. 4(a) is a sectional side view of a color sensor as a light receiving element.
Figure 4B:
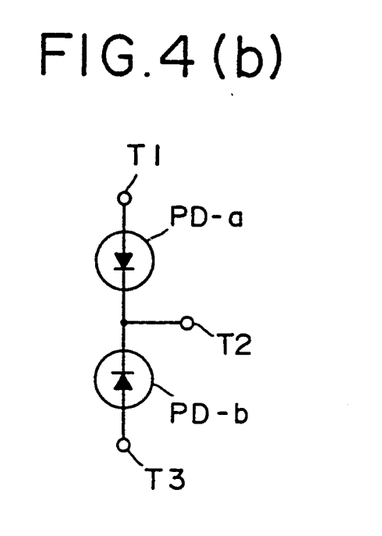
FIG. 4(b) is an equivalent circuit of the color sensor.

The converging lens 6 disposed on a front wall of the photoelectric switch converges the reflected rays from the reflector to the light receiving element 4. The light receiving element 4 employs a color sensor separating rays having different wavelengths to generate signals. Exemplarily, the sensor is constructed to have a pair of photo diodes each having different conjunction depth in a single chip as shown in FIG. 4(a) to discriminate color by utilizing the difference between the respective spectrum characteristics of the diodes. The diodes are represented by an equivalent circuit having a pair of photodiodes PD-a and PD-b as shown in FIG. 4(b) which respectively response curves PD-a and PD-b shown in FIG. 4(c).

Figure 5:
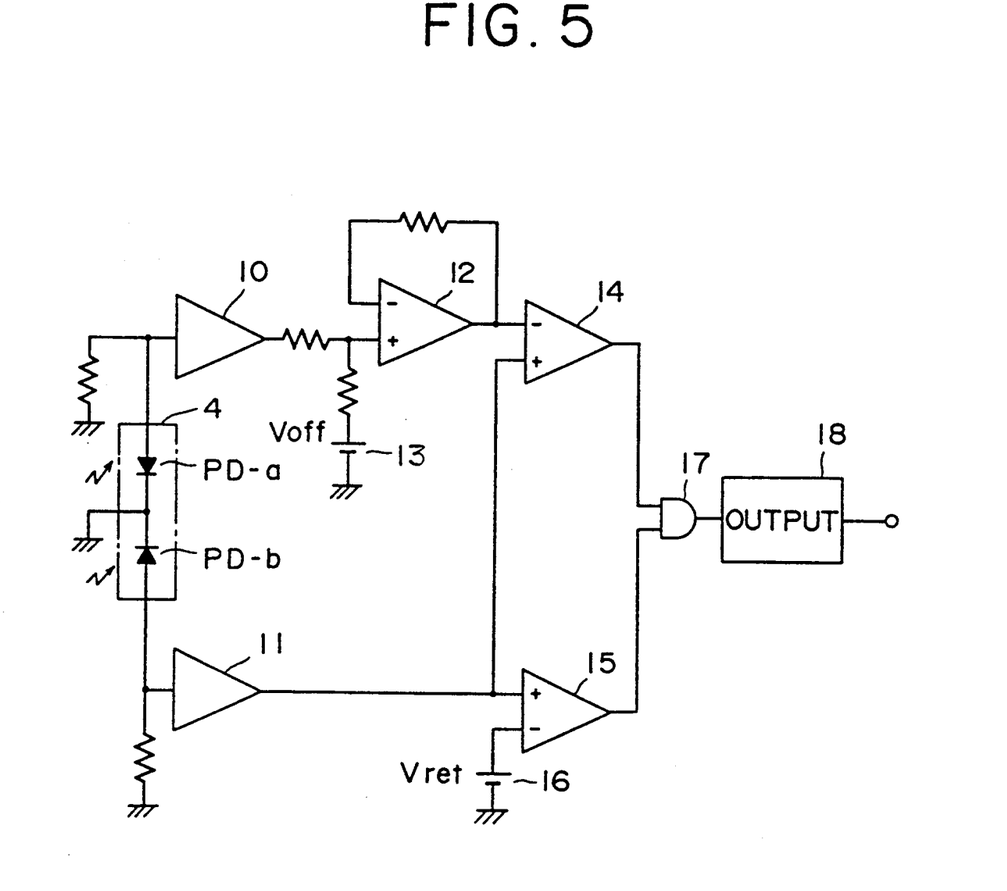
FIG. 5 is a schematic block diagram illustrating an electric construction of a photoelectric switch of this embodiment.

Referring to FIG. 5, and detection circuit section in this embodiment will be described hereinafter. The outputs of the pair of photodiodes PD-a and PD-b are applied to non-inverting amplifiers 10 and 11 which respectively amplify the outputs from the photodiodes at the same amplifying rate. The output from the amplifier 10 is applied to an adder 12 connected to a voltage source 13. The adder 12 sums a minute voltage level $V_{off}$ of the source 13 and the output from the amplifier 10, and its output is applied to a inverting input terminal of an operational amplifier representing a comparator 14. The output from the amplifier 11 is applied to non-inverting input terminals of the respective operation amplifiers representing comparators 14 and 15 as comparing means. The comparator 14 compares the output from the amplifier 10 added by the minute voltage $V_{off}$ with the output from the amplifier 11, and the voltage source 13 is disposed to fix a comparison output to a low "L" level when both outputs from amplifiers 10 and 11 are equal. The comparator 15 at its inverting input terminal is connected with a reference voltage source 16 providing a reference voltage $V_{ref}$ to compare the voltage $V_{ref}$ with an input voltage thereof. The outputs from comparators 14 and 15 are applied to AND circuit 17 to apply their logic product to output circuit 18 which is designed to produce a object detection signal when its output is a low "L" level.

The light emitting diode employed in the light emitting element 3 generates the spectrums represented by the graph of FIG. 2(b), that is, color rays and infrared rays, which are radiated through the lens 5 to the retroreflector 7 remote from the main body of the photoelectric switch. The reflector 7 absorbs red rays and reflects only infrared rays in a same direction. Accordingly, only infrared rays are applied to the light receiving element 4 through converging lens 6. The operation states at the respective portions of the photoelectric switch are represented by the following Table 1:

TABLE 1

|  |  | (I) No object exists | (II) Ordinary object exists | (III) Object having mirror surface exists |
| --- | --- | --- | --- | --- |
| Relative Photo-diode Current Values | PD-a | 1 | 0 | 2 |
|  | PD-b | 5 | 0 | 1 |
| Comparator | 14 | H | L | L |
|  | 15 | H | L | H |
| AND output |  | H | L | L |
| Switch output |  | non | exist | exist |

Figure 4C:
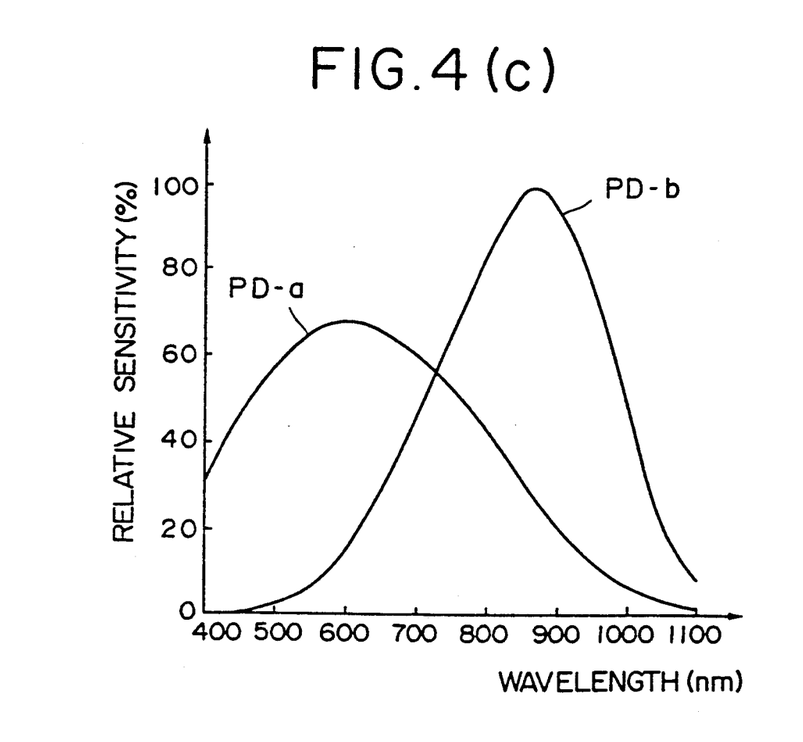
FIG. 4(c) is a graph illustrating a wavelength response of the sensor.

When there is no object to block the light path (I), the photodiode PD-a produces a relatively low level photo-current while the photodiode PD-b produces a high level photo-current since the photodiodes PD-a and PD-b of the light receiving element 4 have the response curves shown in FIG. 4(c). The Table 1 expresses the respective relative values of photo-currents as "1" and "5" when there is no object. The signals corresponding to such photo-currents are amplified by non-inverting amplifiers 10 and 11 for application to the comparators 14 and 15. In this occasion, the output of amplifier 11 is large, so that comparator 14 is a high "H" level. The comparator 15 also produces a high "H" level since a signal larger than a determined threshold level $V_{ref}$. Thus, AND circuit 17 produces a high "H" level and output circuit 18 does not produce any object detection signal.

When an ordinal object 8 to be detected blocks the light path between the photoelectric switch and the reflector 7 (II), neither red rays nor infrared rays are applied to the light receiving element 4. As expressed in Table 1, the photo currents of the photodiodes PD-a and PD-b are zero, and the comparator 15 produces a "L" level. The comparator 14 also produces a "L" level since the non-reversible input terminal of comparator 14 is supplied with the minute voltage $V_{off}$ of the voltage source 13 by adder 12. Thus, the output of AND circuit 17 becomes a "L" level, so that an object detection signal is produced through output circuit 18.

When an object 8 having a mirror surface blocks the light path but reflects rays by the mirror surface (III), the rays having spectrums shown in FIG. 2(b) are applied to the light receiving element 4 through converging lens 6 as they are. The respective photodiodes PD-a and PD-b of the element 4 have spectrum characteristics shown in FIG. 4(c), so that the reflective values of photocurrents of the photodiodes PD-a and PD-b are exemplarily expressed as "2" and "1" shown in Table 1. These photocurrents are amplified as they are to be compared one after another by the comparators 14 and 15. The comparator 14 is "L" because the output from the diode PD-a is large, while the comparator 15 becomes "H" because the input to the non-inverting input terminal of comparator 15 is higher than the reference voltage $V_{ref}$. Thus, the logic product from AND circuit 18 becomes "L", and an object detection signal is produced.

The adder 12 and the AND circuit 17 are employed in this embodiment, but detection signals may be produced by only one of them whether or not the object to be detected has any mirror surface.

Figure 6A:
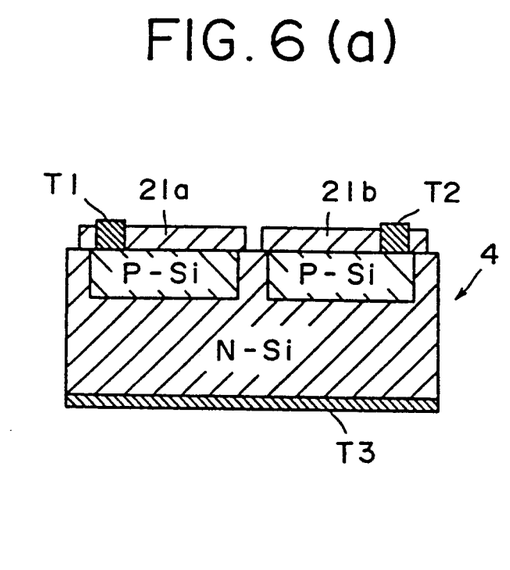
FIG. 6(a) is a sectional side view of a light receiving element as a modification of the first embodiment.
Figure 6B:
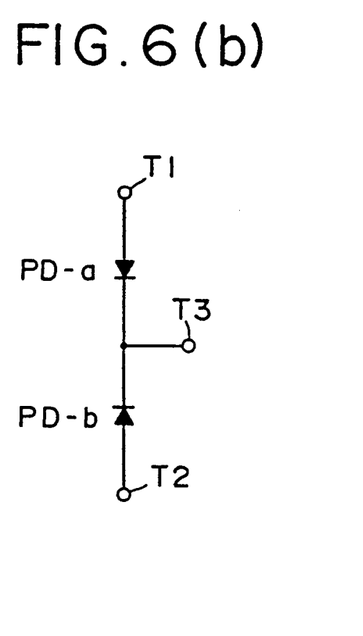
FIG. 6(b) is an equivalent circuit of the element of FIG. 6(a)
Figure 6C:
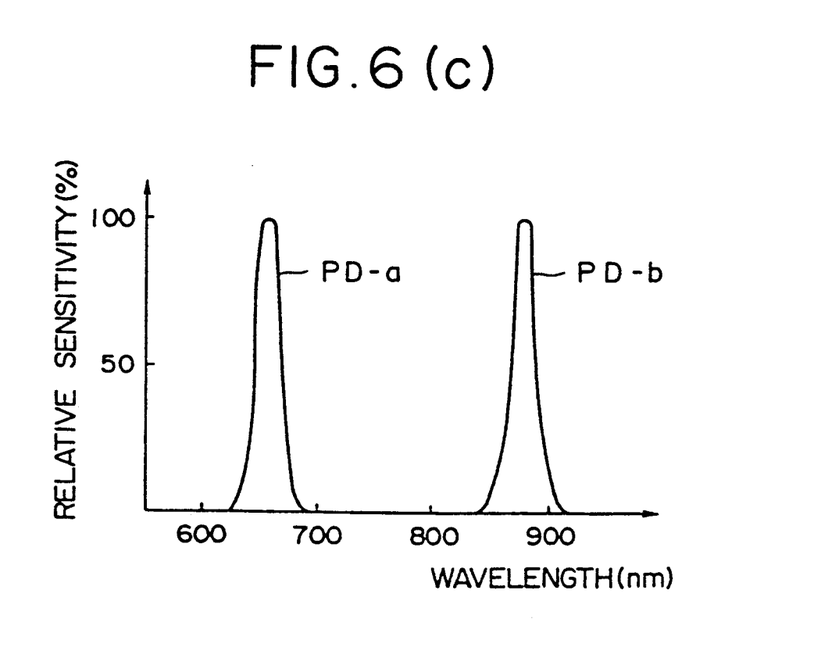
FIG. 6(c) is a graph illustrating a response curve of the element.

Referring to FIGS. 6(a) through 6(c), there is shown a light receiving element modified from the element 4 of the above-mentioned first embodiment. As shown in FIG. 6(a), the light receiving element is constructed to have a pair of photodiodes PD-a and PD-b disposed in a single chip at different light receiving areas. Further, thin interference filters 21a and 21b having different characteristics are disposed on the respective light receiving areas so as to provide different spectrum characteristics. The equivalent circuit of the element of FIG. 6(a) is represented by the circuit of FIG. 6(b) likewise FIG. 2(b), and the respective spectrum characteristics follow the transparency characteristics of the filters 21a and 21b shown by the ecurves PD-a and PD-b of FIG. 6(c). The receiving element of this embodiment is applied to the element 4 and the photoelectric switch of the first embodiment, any object can be detected whether or not the object has a mirror surface as described in the first embodiment.

Figure 7:
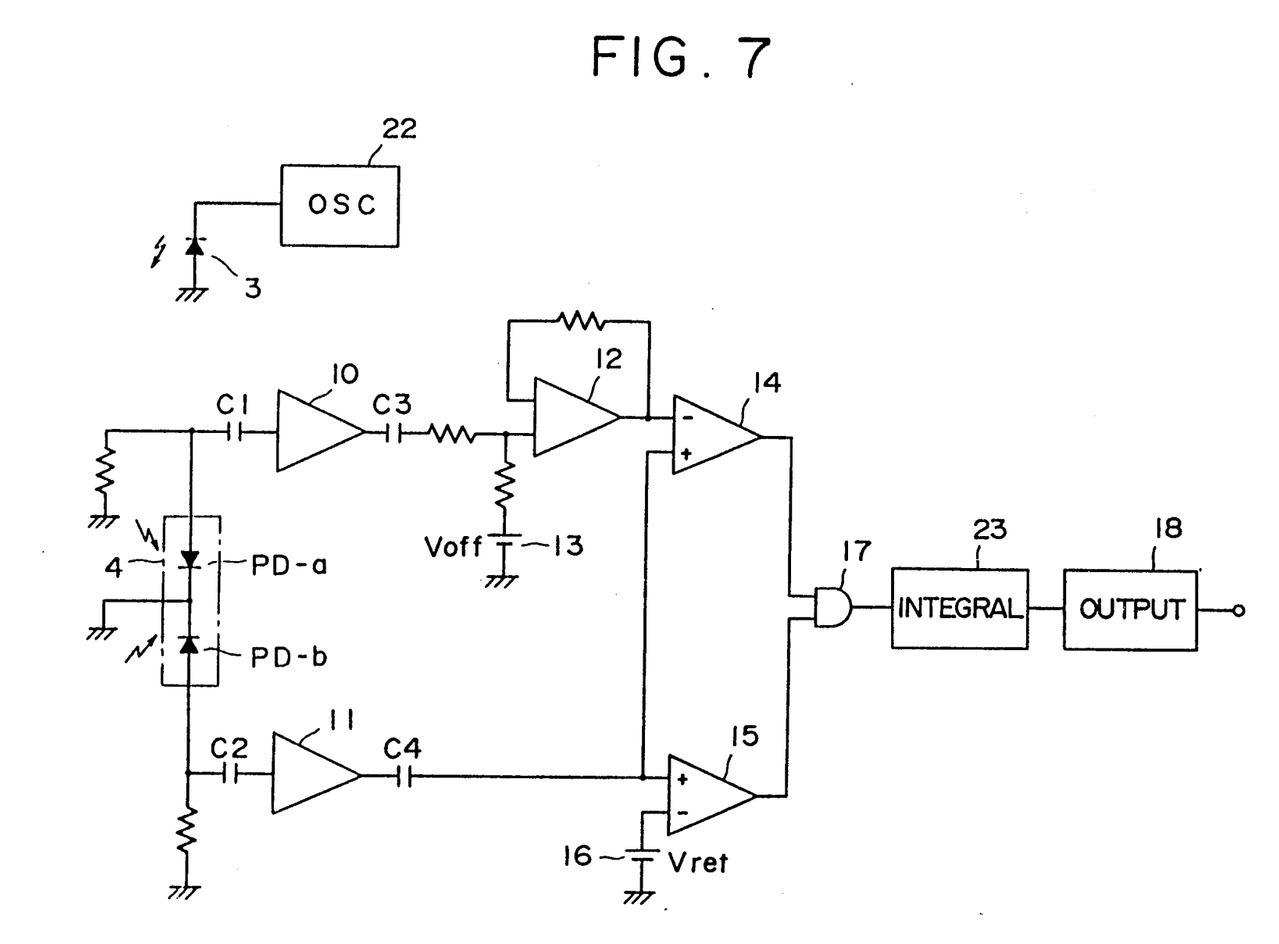
FIG. 7 is a schematic block diagram illustrating an electric construction of a reflection type photoelectric switch as a second embodiment of this invention.
Figure 8:
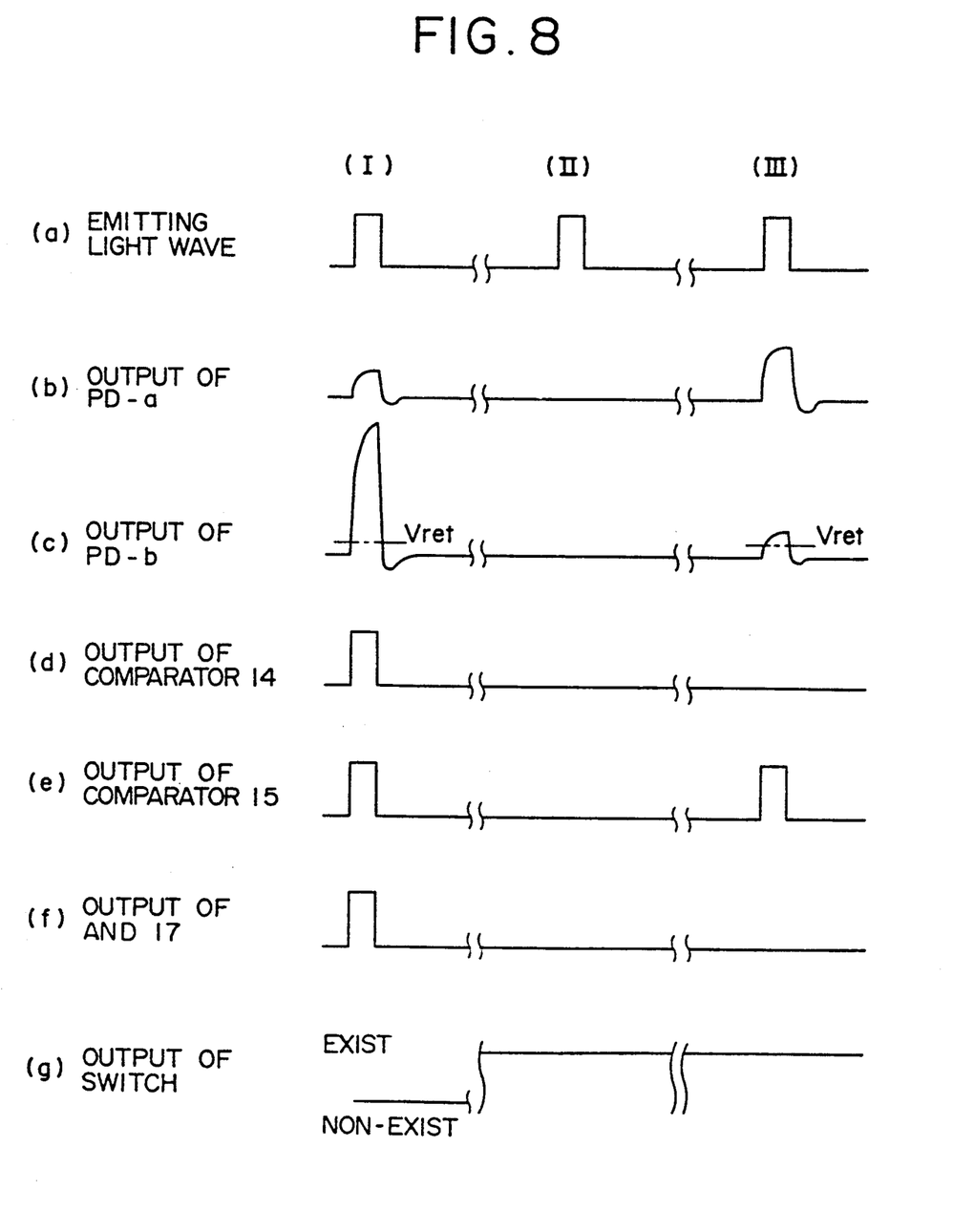
FIG. 8 is a time chart illustrating waveforms at the respective portions.

Referring to FIG. 7, there is shown a circuit diagram of a photoelectric switch as a second embodiment of this invention, in which a light emitting element 3 emits light pulses to avoid affection by external light and improve the detection efficiency through the light emitting diode 3 continuously emits light in the first embodiment. In this embodiment, the light emitting element 3 emits pulsating rays by signals from an oscillation circuit 22. Capacitors C1 and C2 are respectively connected between photodiodes PD-a and PD-b and amplifiers 10 and 11, so that only a.c. components of the outputs from the diode Pd-a and PD-b are applied to the amplifiers 10 and 11 and further applied to comparators 14 and 15 through capacitor C3 including adder 12 or capacitor C4. Moreover, output from AND circuit 17 is applied to integral circuit 23 to apply its output to output circuit 18 after holding it for a predetermined interval. As shown in FIG. 8, if the light signals are emitted from the light emitting diode 3 as illustrated in FIG. 8(a) when there is no object to be detected (I), an ordinary object 8 blocks the light path (II) or an object 8 having a mirror surface blocks the light path (III), the respective photodiodes PD-a and PD-b of the light receiving element 4 produce outputs shown in FIGS. 8(b) and 8(c) which are amplified by amplifiers 10 and 11 as photo-converted electric signals to be compared by comparators 14 and 15, so that output signals shown in FIGS. 8(d) and 8(e) are produced from the comparators 14 and 15. Thus, the logic product of the output signals shown in FIG. 8(f) is obtained from AND circuit 17. The AND circuit 17 produces output at "H" level when any object does not exist or at "L" level when it exists whether or not mirror surface. The output from circuit 17 is held for a predetermined interval by integral circuit 23 for application to output circuit 18 which generates output signals shown in FIG. 8(g) according to non-existance or existance of the object to be detected.

Figure 9:
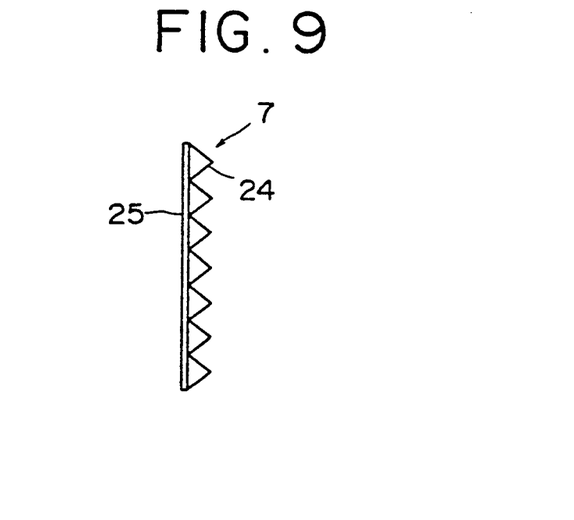
FIG. 9 shows a construction of a retroreflector as a modification of the first embodiment of this invention.

Though the retroreflector 7 in the first embodiment is constituted with combination of corner cubes made of acrylic resins absorbing red light, the reflector 7 may be replaced with a reflector in which an infrared filter 25 passing infrared rays only but blocking red light is applied on a front wall of a unit 24 of combination with transparent corner cubes, if desired, as shown in FIG. 9.

It should be understood that the above description is merely illustrative of this invention and that may changes and modifications are available from the scope of the appended claims.

What is claimed is:

1. A reflection type photoelectric switch which detects the presence of an object, comprising:
   light emitting means for emitting a substantially single light beam having first and second different wavelengths into a space in which the object may be detected, wherein said light emitting means comprises a single light emitting diode which emits light at said first and second wavelengths.
   a reflector for reflecting said substantially single light beam at different rates with respect to said first and second wavelengths,
   light receiving means for sensing said first and second wavelengths of the reflected light beam and which generates outputs in response to said first and second wavelengths, and
   means for analyzing said outputs generated by said light receiving means to generate an output representing the existance in the space of the object detected by the photoelectric switch.

2. A reflection type photoelectric switch according to claim 1 in which said light emitting means includes a light emitting element and a converging lens.

3. A reflection type photoelectric switch according to claim 1 which said light emitting means emits light through a single transparent window.

4. A reflection type photoelectric switch according to claim 1 in which said means for analyzing outputs includes comparing means for comparing the outputs produced from said light receiving means.

5. A reflection type photoelectric switch according to claim 1 in which said reflector has a reflection rate where light at said first wavelength is absorbed but light at said second wavelength is reflected by the reflector.

6. A reflection type photoelectric switch according to claim 1 in which said light emitting means emits light in a pulse mode.

7. A reflection type photoelectric switch according to claim 1 in which said light receiving means comprises first and second light receiving portions.

8. A photoelectric switch which detects the presence of an object, comprising:
   light emitting means for emitting a substantially single light beam having a plurality of wavelengths into a space in which the object may be detected, wherein said light emitting means comprises a single chip light emitting element which emits light at said plurality of wavelengths,
   a reflector for reflecting said substantially single light beam at different reflection rates with respect to said plurality of wavelengths,
   light receiving means for sensing said plurality of wavelengths of the reflected light beam and which generates outputs in response to said plurality of wavelengths,
   means for processing said outputs generated by said light receiving means to produce a plurality of unique signals corresponding to said plurality of wavelengths, and means for analyzing said plurality of unique signals to generate an output representing the existence in the space of an object detected by the photoelectric switch.

9. A photoelectric switch according to claim 8 in which said light emitting means includes a light emitting element and a converging lens.

10. A photoelectric switch according to claim 8 in which said light receiving means includes a single chip light receiving element to sense light at said plurality of wavelengths.

11. A photoelectric switch according to claim 8 in which said light emitting means emits light in a pulse mode.

12. A photoelectric switch according to claim 7 wherein said means for analyzing said unique signals determines whether the received light beam is reflected from the reflector or from an object detected by the photoelectric switch.

* * * * *